United States Patent
Maki (10) Patent No.: US 10,698,471 B2
(45) Date of Patent: Jun. 30, 2020

(54) INFORMATION PROCESSING APPARATUS AND INFORMATION PROCESSING METHOD

(71) Applicant: LENOVO (SINGAPORE) PTE. LTD., Singapore (SG)

(72) Inventor: Koutaroh Maki, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 100 days.

(21) Appl. No.: 16/113,925

(22) Filed: Aug. 27, 2018

(65) Prior Publication Data

US 2019/0391630 A1  Dec. 26, 2019

(30) Foreign Application Priority Data

Jun. 22, 2018  (JP) ................................. 2018-119195

(51) Int. Cl.
  *G06F 1/00* (2006.01)
  *G06F 1/3228* (2019.01)
  *G06F 1/329* (2019.01)
  *G06F 1/3215* (2019.01)

(52) U.S. Cl.
  CPC ............ *G06F 1/3228* (2013.01); *G06F 1/329* (2013.01); *G06F 1/3215* (2013.01)

(58) Field of Classification Search
  CPC .................................................. G06F 1/3228
  See application file for complete search history.

(56) References Cited

U.S. PATENT DOCUMENTS

| 2003/0105983 A1* | 6/2003 | Brakmo ................ G06F 1/3203 713/320 |
| 2013/0091369 A1* | 4/2013 | Shih ....................... G06F 1/3231 713/323 |
| 2014/0189401 A1* | 7/2014 | Keppel .................. G06F 1/3206 713/323 |
| 2015/0178091 A1* | 6/2015 | Offen .................... G06F 9/3861 712/228 |
| 2016/0212702 A1* | 7/2016 | Ghosh ............... H04W 52/0216 |
| 2019/0196567 A1* | 6/2019 | Ye ........................... G06F 1/206 |

FOREIGN PATENT DOCUMENTS

JP          2015-176388 A      10/2015

* cited by examiner

*Primary Examiner* — Mohammed H Rehman
(74) *Attorney, Agent, or Firm* — Shimokaji IP (57) ABSTRACT

An information processing apparatus balances the reduction of return time with the reduction of power consumption in accordance with the use status of a user and a time zone in which it is scheduled to be used. The information processing apparatus includes a processor. The processor is configured to: enter a first sleep state when transition is performed from an active state to an idle state; transition to a second sleep state having a longer return time to the active state than the first sleep state if there is not an operation of the user for a first idle time when entering the first sleep state before a previously set scheduled use-end time after a previously set scheduled use-start time; and transition to the second sleep state if there is not an operation of the user for a second idle time shorter than the first idle time when entering the first sleep state before the scheduled use-start time after the scheduled use-end time.

8 Claims, 9 Drawing Sheets

INFORMATION PROCESSING APPARATUS AND INFORMATION PROCESSING METHOD

FIELD OF THE INVENTION

The present invention relates to an information processing apparatus and an information processing method.

BACKGROUND OF THE INVENTION

An information processing apparatus such as a laptop terminal apparatus has a plurality of sleep states in which the information processing apparatus enters a standby state to suppress power consumption. The transition between the plurality of sleep states includes transition from an active state (normal operating state) to any sleep state and transition from one sleep state to another sleep state, in accordance with the passage of a standby time (idle time) of the information processing apparatus, for example. As an example, Japanese Patent No. 5,941,490 discloses a computer that is provided with two sleep states having different standby power consumptions to transition to a sleep state having larger power consumption after the transition to an active state.

In the information processing apparatus, a transition method between the plurality of sleep states includes a method of transitioning from a sleep state (hereinafter, also referred to as "shallow sleep state"), such as a standby state, having a relatively short return time to an active state to a sleep state (hereinafter, also referred to as "deep sleep state"), such as a hibernation state, having a relatively long return time to the active state after a predetermined idle time. In general, a shallow sleep state has larger power consumption than a deep sleep state, and the reduction of return time and the reduction of power consumption have a trade-off relationship.

The transition method between the sleep states has a problem that any of the reduction of power consumption and the reduction of return time is sacrificed when the same idle time is applied to both of a time zone in which a user frequently uses an information processing apparatus or schedules to use it and a time zone in which the user does not frequently use the information processing apparatus or does not schedule to use it. For example, when a long idle time tailored to the time zone in which the information processing apparatus is frequently used is applied to the information processing apparatus, it is hard to transition to a deep sleep state even in the time zone in which it is not frequently used, and thus the reduction of power consumption cannot be achieved. On the other hand, when a short idle time tailored to the time zone in which the information processing apparatus is not frequently used is applied to the information processing apparatus, it is easy to transition to the deep sleep state between the suspend and resuming of the information processing apparatus in the time zone in which it is frequently used, and thus the return to the active state may require time.

Therefore, the present inventors have found that the reduction of return time is compatible with the reduction of power consumption in accordance with the use of an information processing apparatus by providing two idle times respectively corresponding to a time zone in which the information processing apparatus is frequently used and a time zone in which it is not frequently used.

In other words, an object of the present invention is to provide an information processing apparatus and an information processing method in which the reduction of return time can be compatible with the reduction of power consumption in accordance with the use of the information processing apparatus.

SUMMARY OF THE INVENTION

An information processing apparatus according to the first aspect of the present invention includes a processor configured to: enter a first sleep state when transition is performed from an active state to an idle state; transition to a second sleep state having a longer return time to the active state than the first sleep state if there is not an operation of a user for a first idle time when entering the first sleep state before a previously set scheduled use-end time after a previously set scheduled use-start time; and transition to the second sleep state if there is not an operation of the user for a second idle time shorter than the first idle time when entering the first sleep state before the scheduled use-start time after the scheduled use-end time.

An information processing method according to the second aspect of the present invention includes: causing a computer to enter a first sleep state when transition is performed from an active state to an idle state and to transition to a second sleep state having a longer return time to the active state than the first sleep state if there is not an operation of a user for a first idle time when entering the first sleep state before a previously set scheduled use-end time after a previously set scheduled use-start time; and causing the computer to transition to the second sleep state if there is not an operation of the user for a second idle time shorter than the first idle time when entering the first sleep state before the scheduled use-start time after the scheduled use-end time.

According to these aspects of the present invention, the relatively long first idle time is applied to the time zone in which the information processing apparatus is scheduled to be used and the relatively short second idle time is applied to the time zone in which the information processing apparatus is scheduled not to be used, and among two sleep states, transition can be performed from a shallow sleep state to a deep sleep state after the idle times associated with the respective time zones.

Effects of the Invention

The above-described aspects of the present invention can provide the information processing apparatus and the information processing method in which the reduction of return time can be compatible with the reduction of power consumption in accordance with the use of the information processing apparatus.

DETAILED DESCRIPTION OF THE INVENTION

Exemplary embodiments of the present invention will be explained with reference to the accompanying drawings. In addition, the components of the same reference numbers in the drawings have the same or similar configuration.

First Embodiment

1. Brief

The brief of the transition between sleep states of a computer 100 according to the first embodiment will be explained with reference to FIG. 1. Hereinafter, a function of causing the computer 100 according to the present embodiment to transition between a plurality of sleep states by using two idle times is referred to as a "state transition function". In the present embodiment, there is explained an example in which two sleep states are provided with respect to the computer 100 and the transition is performed between these two sleep states by using two idle times respectively associated with a time zone in which the computer 100 is frequently used and a time zone in which it is not frequently used. Among these two sleep states, one sleep state, such as a standby state, in which a return time to an active state is short is called "a first sleep state" or "a shallow sleep state", and another sleep state, such as a hibernation state, in which the return time is a relatively longer than that of the first sleep state is called "a second sleep state" or "a deep sleep state".

Figure 1:
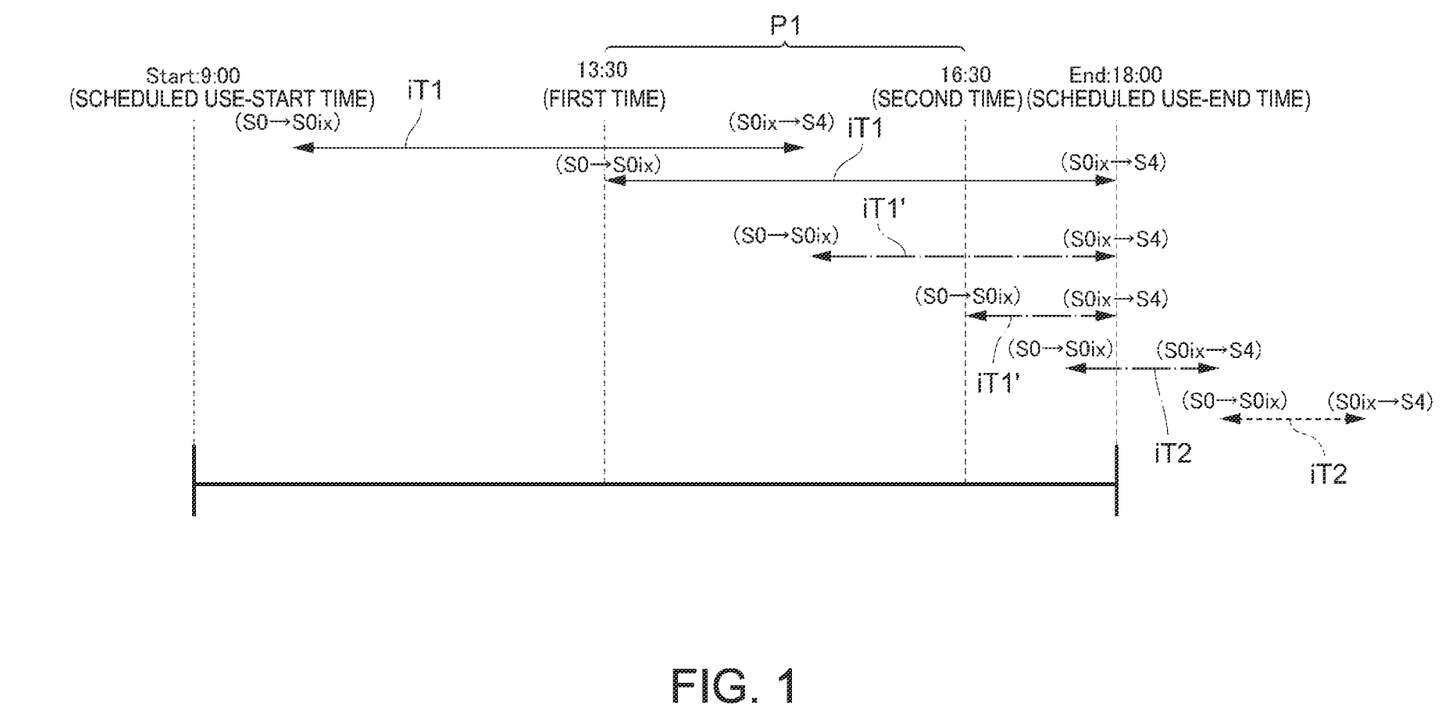
FIG. 1 is a schematic diagram explaining a computer according to a first embodiment.

As illustrated in FIG. 1, the computer 100 sets a scheduled use-start time to "9:00" and a scheduled use-end time to "18:00". The computer 100 applies a first idle time iT1 (300 minutes) to an interval (hereinafter, called "use time zone") from the scheduled use-start time to the scheduled use-end time. In addition, values illustrated herein can be changed to appropriate values depending on the embodiments or by users.

When the transition to an idle state is performed in the use time zone, the computer 100 transitions from an S0 state of a normal operating state (hereinafter, also called "active state") to an S0ix state of the first sleep state. The S0 state is a power state defined by ACPI (Advanced Configuration and Power Interface) that is one of standards related to power control of a computer etc. The S0ix state indicates a sleeping state such as Modern Standby that is employed by Windows (registered trademark) 10.

The computer 100 transitions from an active state to an idle state by closing a cover connected to a main body by a user, by pressing a power button by the user, by performing an operation on an OS (operating system) (for example, selecting sleep on a power menu displayed on a screen), or by running beyond a predetermined time in the state where the user does not operate the computer, if the computer is a laptop terminal, for example.

Herein, the power state and S0ix state of the ACPI will be explained. ACPI defines an S0 state (power-on state (normal operating state)), four sleeping states (sleep states) from S1 state to S4 state, and an S5 state (soft-off state). Because the present embodiment will be explained by using the S0 state, the S0ix state, and the S4 state, the details of these power states will be explained below.

The S0 state is a normal operating state such as a power-on state. The S0 state relative to a sleeping state is a state where power is essentially supplied to all devices necessary for the activation of the computer 100 and the computer can be completely activated by software. The transition from a sleeping state to the S0 state is called "return" or "wakeup".

In the present embodiment, the S0ix state that has a shorter return time than the S3 state and smaller power consumption than the S0 state is employed as the sleeping state. The S0ix state is an extended state of the S0 state defined by ACPI. In the S0ix state, the return to the active state can be quickly performed because the power feeding to a system memory is maintained. Moreover, when a predetermined trigger event is performed on the computer 100 without the operation of the user in the S0ix state, the switching can be performed from the idle state to the active state only for a predetermined time. The predetermined trigger event is, for example, a waking event caused by an interrupt from a network device, such as the execution of a maintenance task and the reception of an electronic mail.

As an example, the S0ix state technology can include a technology called Connected Standby and Runtime D3 employed by Windows 8 and a technology called Modern Standby employed by Windows 10. The computer 100 can detect a waking event caused by an interrupt from a network device such as a wireless LAN by using the Connected Standby or Modern Standby when the computer is not used by the user.

To realize the S0ix state, the computer 100 may include, for example, an AOAC (Always On Always Connected) environment that is constantly accessible to a network and can immediately perform the ON/OFF of a power source. In the present embodiment, the S0ix state is employed as the first sleep state, but the S3 state may be employed as the first sleep state.

The S4 state is a sleeping state in which working contents are written into HDD, other nonvolatile memories, or the like and power is supplied to only the devices required for the restart. Moreover, the S4 state is called a hibernation state (dormant state) as a power state having a longest return time among the sleep states supported in ACPI. When the computer 100 transitions from the S0 state to the S4 state, the OS stores the just previous system context including the memory content of the system memory in the HDD etc., and then stops the supply of power to devices other than the minimum number of devices required for the activation of the power source.

The computer 100 can have at least one of the power states defined by the ACPI and can transit to any state of the power states. Moreover, a combination of the first and second sleep states in the computer 100 may use a combination of any two sleep states of the four sleeping states, or may use a combination including a sleep state (for example, S0ix state etc.) other than the four sleeping states. In other words, the combination may be any combination if two sleep states have a relative difference between return times.

Returning to FIG. 1, the explanation is continued. The computer 100 transitions from the S0ix state to the S4 state of the second sleep state when a time in which the user's operation is not performed runs beyond the first idle time iT1 from a time at which the computer 100 enters the idle state. In other words, the second sleep state is a sleep state having a longer return time up to the active state than that of the first sleep state. This configuration can cause the computer 100 to stepwise transition to a deep sleep state between the idle states in which the computer 100 is not used for a long time, so as to be able to achieve the reduction of power consumption.

The computer 100 applies a second idle time iT2 (90 minutes) shorter than the first idle time iT1 to an interval (hereinafter, called "non-use time zone") from the scheduled use-end time to the next scheduled use-start time. When the transition to an idle state is performed in the non-use time zone, the computer 100 transitions from the S0 state to the S0ix state. When a time in which a user's operation is not performed runs beyond the second idle time iT2 from a time at which the computer 100 enters the idle state, the computer 100 transitions from the S0ix state to the S4 state.

The computer 100 may changeably set the first idle time iT1 in an interval (hereinafter, also called "adjustment phase P1") between a first time (13:30) obtained by going back by the first idle time iT1 from the scheduled use-end time and a second time (16:30) obtained by going back by the second idle time iT2 from the scheduled use-end time. This configuration can cancel a state in which the transition is not performed from the S0ix state to the S4 state when the preset first idle time iT1 does not pass even if the scheduled use-end time is passed.

When the transition to the idle state is performed between 13:30 and 16:30, for example, the computer 100 applies a changeably set first idle time iT1' to gradually decrease from the first idle time iT1 to the second idle time iT2 as it approaches the second time. After 16:30 in the use time zone, the computer 100 applies, without change, the second idle time iT2 that is the first idle time iT1' set when the transition to an idle state is performed at 16:30. According to this configuration, even when the computer 100 becomes an idle state just before the scheduled use-end time, the transition to the S4 state can be performed with a temporal margin for the second idle time iT2 because the transition to the S4 state deeper than the S0ix state is not performed immediately after becoming the scheduled use-end time.

2. Configuration 2-1. Hardware Configuration of Computer

Figure 2:
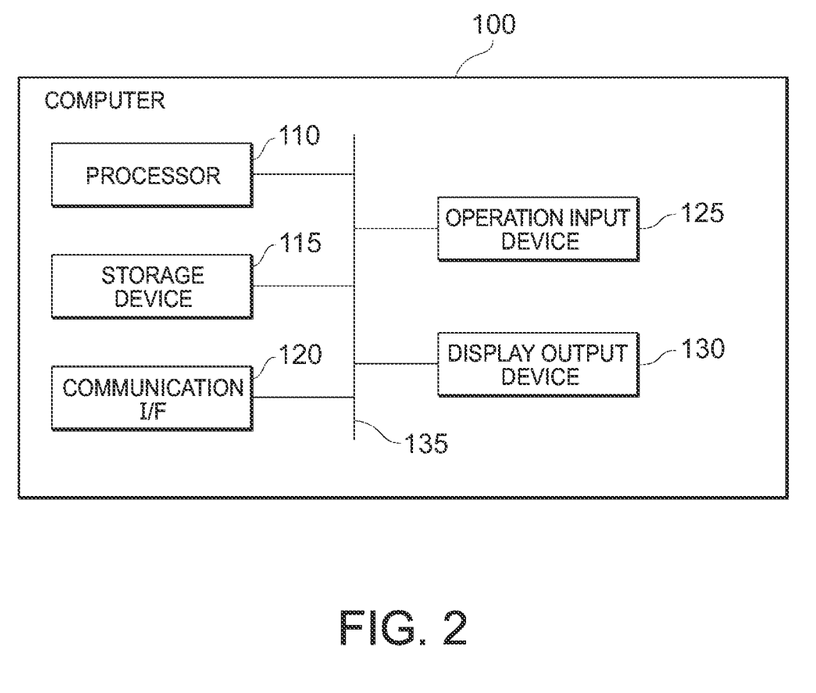
FIG. 2 is a diagram illustrating an example of the hardware configuration of the computer according to the first embodiment.

An example of the hardware configuration of the computer 100 will be explained with reference to FIG. 2. The computer 100 is an information processing apparatus in which the transition between the plurality of sleep states can be performed. The computer can be an information terminal such as a smartphone, a tablet terminal, a laptop terminal, and a desktop terminal. As illustrated in FIG. 2, the computer 100 illustratively includes a processor 110, a storage device 115, a communication I/F (interface) 120, and a bus 135. Moreover, the computer 100 may include an operation input device 125 or a display output device 130.

The processor 110 is a processing device that performs the calculation, processing, and transfer of data and the execution of a program.

The processor 110 is configured to: (i) enter the first sleep state when the transition is performed from an active state to an idle state; (ii) transition to the second sleep state having a longer return time up to the active state than that of the first sleep state if there is no operation of the user for the first idle time iT1 when entering the first sleep state before the previously set scheduled use-end time after the previously set scheduled use-start time; and (iii) transition to the second sleep state if there is no operation of the user for the second idle time iT2 shorter than the first idle time iT1 when entering the first sleep state before the scheduled use-start time after the scheduled use-end time.

When the scheduled end time of the first idle time exists after the second idle time iT2 passes from the scheduled use-end time, the processor 110 transitions to the second sleep state after the second idle time iT2 passes from the scheduled use-end time.

The storage device 115 is a device, which stores a program and data, such as a main memory (for example, volatile memory or random-access memory, etc.), an auxiliary storage device (for example, nonvolatile memory etc.), and an external storage device.

The communication I/F 120 is a device that transmits and receives a program and data to and from an external device. For example, the communication I/F 120 includes an interface for a communication network of a mobile phone and/or an interface for a wireless LAN such as a Wi-Fi network. The communication I/F 120 may include a wired interface. When the computer 100 is in the S0ix state, the communication I/F 120 restrictively enters an active state to perform the transmission and reception of data etc.

The operation input device 125 is a device that receives the operation input from the user. The operation input device 125 may be a touch panel integral with the display output device 130 as soft keys, for example. Moreover, the operation input device 125 may be operation buttons provided for the computer 100 as hard keys. Furthermore, the operation input device 125 may be provided outside the computer 100, namely may be a keyboard and/or a mouse pad, for example.

The display output device 130 is an output device that displays an image. The display output device 130 is a liquid crystal display or an organic electroluminescence display, for example. The display output device 130 may be provided outside the computer 100.

The bus 135 is a communication channel that connects the devices described above to each other to exchange data, control information, etc. between the devices.

2-2. Functional Configuration of Information Processing Apparatus

Figure 3:
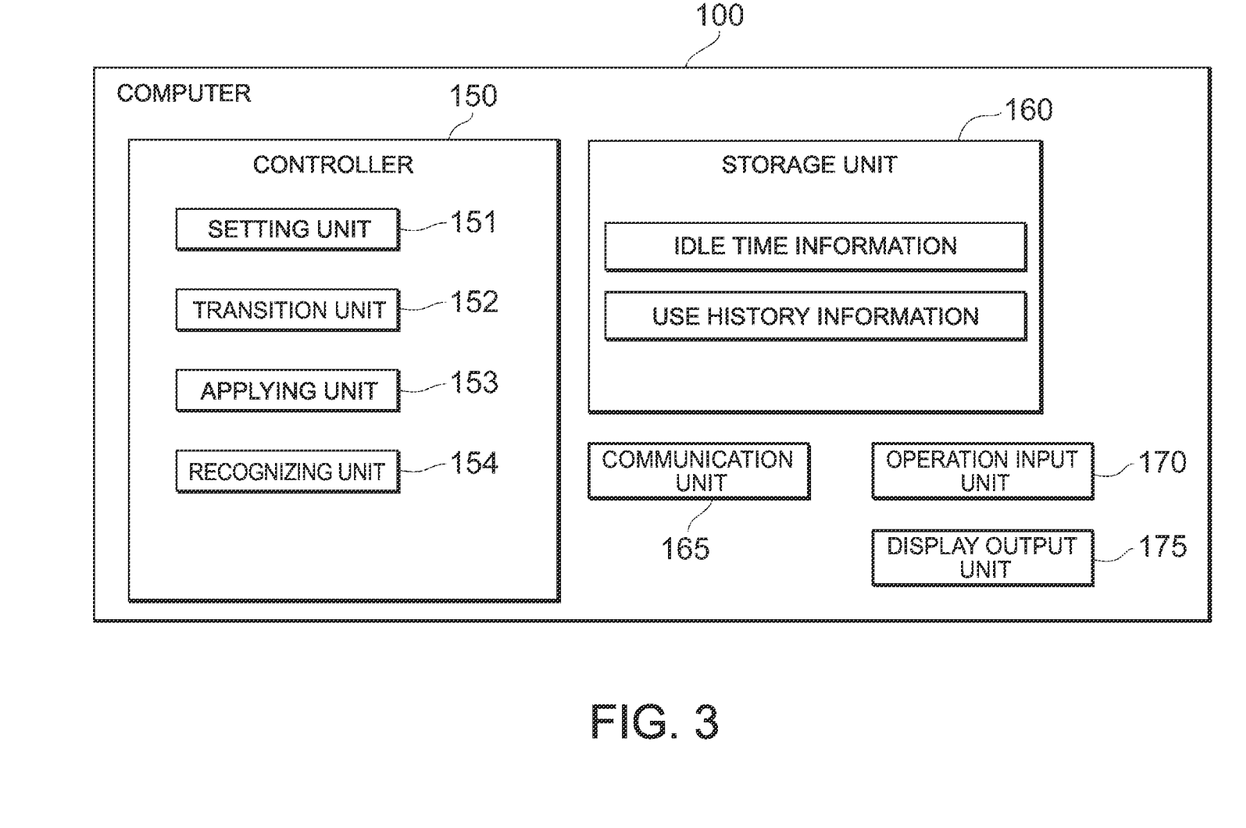
FIG. 3 is a diagram illustrating an example of the functional configuration of the computer according to the first embodiment.

An example of the functional configuration of the computer 100 will be explained with reference to FIG. 3. The computer 100 illustratively includes a controller 150, a storage unit 160, and a communication unit 165. Moreover, the computer 100 may include an operation input unit 170 or a display output unit 175. Each functional component illustrated in FIG. 3 is realized by hardware, software, etc. of the devices illustrated in FIG. 2. More specifically, each functional component illustrated in FIG. 3 can be realized, for example, by using storage areas of the storage device 115 and/or by executing programs stored in the storage device 115 by using the processor 110.

The controller 150 illustratively includes a setting unit 151 that sets use time zones etc. of the computer 100, a transition unit 152 that performs transition between the sleep states of the computer 100, and an applying unit 153 that applies an idle time to the computer 100. Moreover, the controller 150 may include a recognizing unit 154 that recognizes the use patterns of a user in the computer 100, for example. The controller 150 corresponds to the processor 110 illustrated in FIG. 2.

The setting unit 151 sets the scheduled use-start time and scheduled use-end time of the computer 100. For example, such a setting method includes: (1) a method of dynamically setting the times by the setting input from the user on a parameter screen; and (2) a method of setting the times by using fixed parameters such as registry parameters of the computer 100.

A "parameter screen" is a screen for setting parameters used for the transition between the sleep states of the computer 100. For example, the parameter screen is a screen for setting the validity or invalidity of the state transition function and/or for setting the scheduled use-start time or scheduled use-end time. The configuration example of the parameter screen will be explained with reference to FIG. 4 in "3. Example of Screen" to be described later.

The setting unit 151 can set the first idle time iT1 or the second idle time iT2 by using the same method as the setting method (1) or (2) of the scheduled use-start time etc.

Based on use history information that indicates the use status of the computer 100, the setting unit 151 may set at least one of the scheduled use-start time and the scheduled use-end time tailored to the use status of the computer 100. For example, based on the use-start time pattern or the use-end time pattern recognized by using the use history information by the recognizing unit 154 to be described later, the setting unit 151 may set the scheduled use-start time or the scheduled use-end time. According to this configuration, because the scheduled use-start time etc. tailored to the use status based on the usage history of the computer 100 can be set, the convenience of the computer 100 can be improved.

The transition unit 152 causes the computer 100 to transition from the first sleep state to the second sleep state after the first idle time iT1 or the second idle time iT2 shorter than the first idle time iT1.

For example, the transition unit 152 may cause the computer 100 to transition from the S0ix state of the first sleep state to the S4 state of the second sleep state after the first idle time iT1 (for example, 300 minutes) passes when the computer 100 becomes the idle state in the use time zone. Moreover, for example, the transition unit 152 may cause the computer 100 to transition from the S0ix state to the S4 state after the second idle time iT2 (for example, 90 minutes) passes when the computer 100 becomes the idle state in the non-use time zone.

Furthermore, the transition unit 152 may cause the computer 100 to transition to the first sleep state when the computer 100 is in the second sleep state at the time when arriving at the scheduled use-start time. According to this configuration, at the time when the use of the computer 100 starts, the computer can return from the first sleep state having a shorter return time than that of the second sleep state.

When the computer 100 becomes the idle state in the use time zone, the applying unit 153 applies the first idle time iT1 to the computer 100. Moreover, when the computer 100 becomes the idle state in the non-use time zone, the applying unit 153 applies the second idle time iT2 to the computer 100. More specifically, the applying unit 153 determines whether the time at which the computer becomes the idle state is in the use time zone, for example, and applies the first idle time iT1 or the second idle time iT2 to the computer based on the result of determination.

When the scheduled end time of the applied first idle time iT1 is posterior to the scheduled use-end time, the applying unit 153 changes the first idle time iT1 to the first idle time iT1' to make the computer 100 transition from the first sleep state to the second sleep state after a predetermined time from the scheduled use-end time.

For example, when the scheduled end time of the applied first idle time iT1 is after the scheduled use-end time, the applying unit 153 may set the first idle time iT1' to make the computer 100 transit to the second sleep state after the scheduled use-end time. However, when the scheduled end time of the first idle time iT1 is after the scheduled use-end time, the first idle time iT1' is set not to fall below the second idle time iT2. In other words, the applying unit 153 may changeably set the first idle time so that the first idle time iT1 is gradually decreased up to the second idle time iT2 as it approaches the second time between the first time and the second time.

Based on the use history information of the computer 100 accumulated in the storage unit 160 for a predetermined period, the recognizing unit 154 recognizes a use pattern of the computer 100.

The "use history information" is information that indicates the use status of the computer 100. For example, the use history information is, in a predetermined period, information indicating the history of time related to the use of the computer 100, such as (1) history of a time (hereinafter, called "earliest return time") at which the computer 100 returns to an active state at the earliest within a day as a time at which a user begins to actually use the computer 100, and (2) history of a time (hereinafter, called "latest standby time") at which the computer 100 enters an idle state at the latest within the day as a time at which the user finishes actually using the computer 100. Moreover, the "predetermined period" herein means a period for accumulating the use history information of the computer 100. As the predetermined period, it is only necessary to set a general period (for example, one month, a half year, one year, etc.) for which the use pattern of the computer 100 by a specific user can be determined, for example.

For example, based on the accumulated use history information, the recognizing unit 154 may perform pattern recognition on at least one of the use-start time pattern and the use-end time pattern of the computer 100. Specifically, the recognizing unit 154 performs statistical analysis based on the use history information indicating the history of the earliest return time or the latest standby time of the computer 100 in the predetermined period. As the result of the statistical analysis, the recognizing unit 154 calculates a medium value, an average value, or a mode value of the earliest return time or the latest standby time. The recognizing unit 154 can recognize the calculated medium value etc. of the earliest return time as the use-start time pattern, and further recognize the calculated medium value etc. of the latest standby time as the use-end time pattern.

The storage unit 160 accumulates the use history information of the computer 100 for the predetermined period. Moreover, the storage unit 160 may store therein idle time information that indicates the first idle time iT1 and the second idle time iT2. The storage unit 160 corresponds to the storage device 115 illustrated in FIG. 2.

The communication unit 165 transmits and receives messages etc. to and from the outside via a network. When the first sleep state is the S0ix state, the communication unit 165 restrictively enters the active state to perform transmission and reception while the computer 100 is in the first sleep state. The communication unit 165 corresponds to the communication I/F 120 illustrated in FIG. 2.

The operation input unit 170 receives an operation input from the user of the computer 100. For example, the operation input unit 170 receives a designated input of the scheduled use-start time, the scheduled use-end time, or the like on the parameter screen. Moreover, the operation input unit 170 may receive a designated input as to whether the state transition function of the computer 100 is valid or invalid. The operation input unit 170 corresponds to the operation input device 125 illustrated in FIG. 2. The details of the parameter screen will be explained with reference to FIG. 4 in "3. Example of Screen" to be described later.

The display output unit 175 displays the parameter screen in accordance with display designation etc. from the user of the computer 100.

3. Example of Screen

Figure 4:
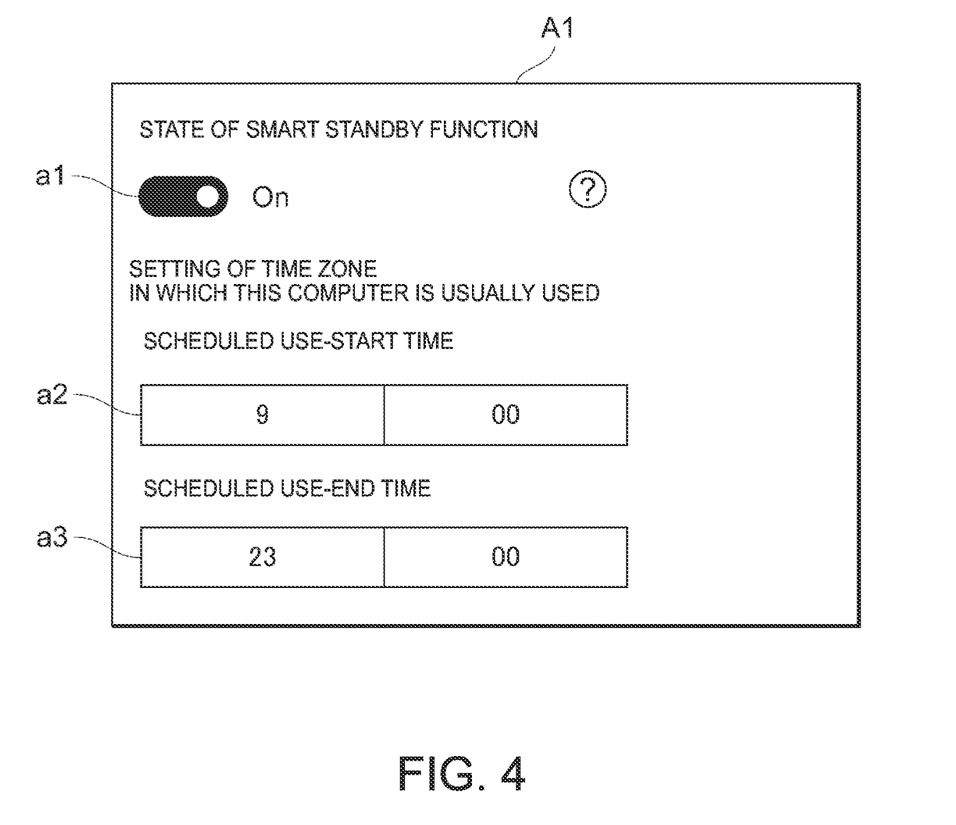
FIG. 4 is a diagram illustrating an example of a screen of the computer according to the first embodiment.

An example of a screen of the computer 100 will be explained with reference to FIG. 4. FIG. 4 is a diagram illustrating an example of a parameter screen A1. As illustrated in FIG. 4, the parameter screen A1 includes a state setting button a1, a scheduled use-start time form a2, and a scheduled use-end time form a3. In addition, the kind (e.g., check box etc.) of each component is merely an example, and thus the present embodiment is not limited to this. Moreover, the parameter screen A1 may include an input item for setting an idle time such as the first idle time iT1 (not illustrated) and the second idle time iT2 (not illustrated), for example.

The state setting button a1 receives a setting input as to whether the state transition function (in this example, also called "smart standby") is made valid (ON) or invalid (OFF). The use-start time form a2 receives a setting input for the scheduled use-start time of the computer 100. The use-end time form a3 receives a setting input for the scheduled use-end time of the computer 100.

4. Operations

Figure 5:
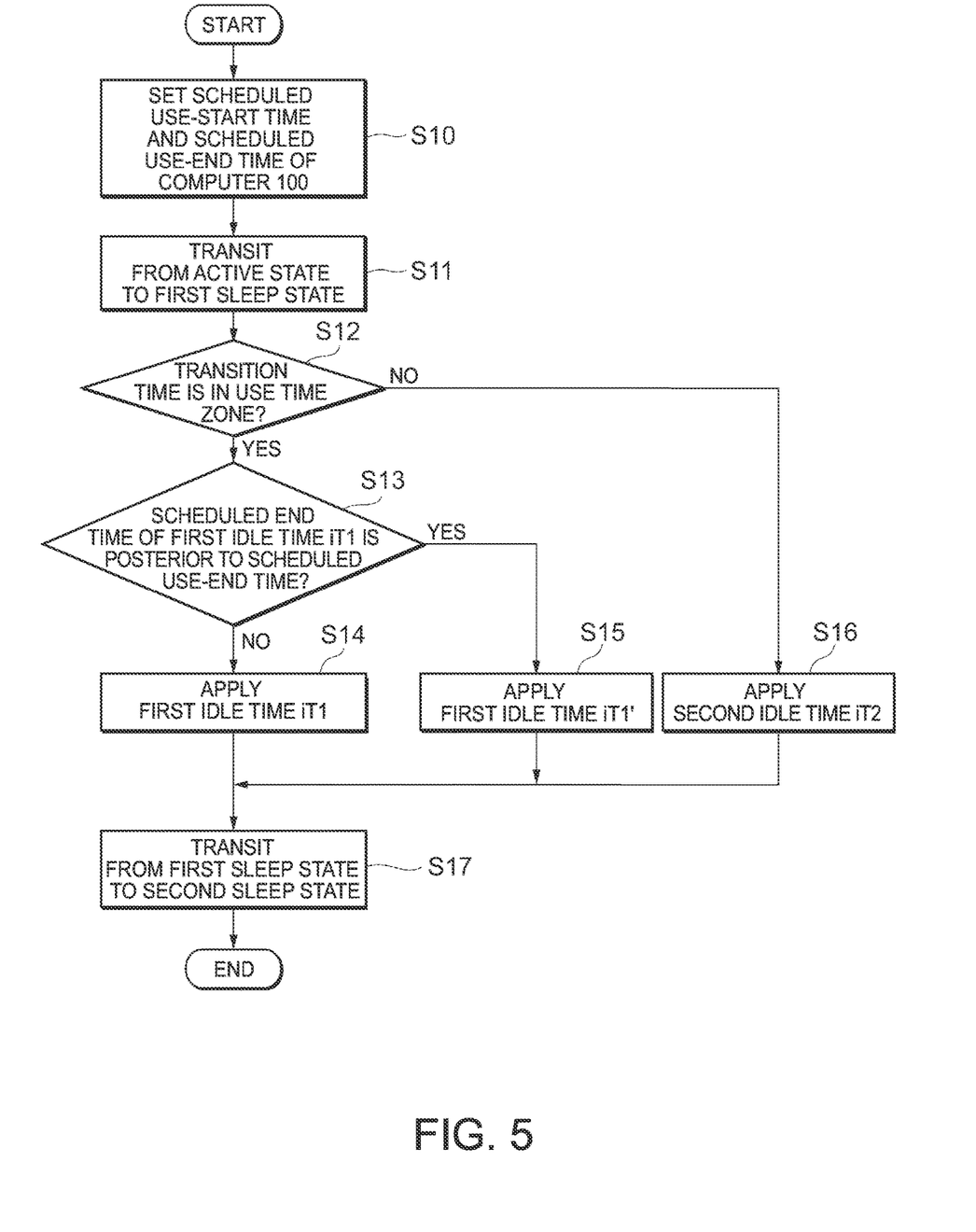
FIG. 5 is a diagram illustrating an example of operations of the computer according to the first embodiment.

An example of operations in the computer 100 will be explained with reference to FIG. 5. FIG. 5 is a flowchart illustrating an example of the flow of a transition process between the sleep states of the computer 100. In the present example, there will be explained a case where the adjustment of the first idle time iT1 in the use time zone of the computer 100 is performed exclusively within the adjustment phase P1.

As illustrated in FIG. 5, in the computer 100, the setting unit 151 sets the scheduled use-start time and scheduled use-end time of the computer 100 (S10). When the computer 100 enters the idle state, the transition unit 152 transits from the active state to the first sleep state (S11).

The applying unit 153 determines whether a time at which it enters the idle state is in the use time zone (S12). When it is determined that the time at which it enters the idle state is in the use time zone (S12: YES), the applying unit 153 determines whether a scheduled end time of the first idle time iT1 is after the scheduled use-end time (S13).

When it is determined that the scheduled end time of the first idle time iT1 is before the scheduled use-end time (S13: NO), the applying unit 153 applies the first idle time iT1 (S14).

When it is determined that the scheduled end time of the first idle time iT1 is after the scheduled use-end time (S13: YES), the applying unit 153 changes the idle time to the first idle time iT1' to apply the first idle time iT1' (S15) in such a manner that the computer 100 transitions to the second sleep state at the scheduled use-end time and the first idle time iT1 does not fall below the second idle time iT2.

When it is determined that the time at which it enters the idle state is not in the use time zone (S12: NO), the applying unit 153 applies the second idle time iT2 (S16).

After the applied idle time (the first idle time iT1, the first idle time iT1', or the second idle time iT2) has elapsed, the transition unit 152 makes the computer 100 transition from the first sleep state to the second sleep state (S17).

Furthermore, the above described processing steps may be performed in optionally changed order or in parallel within a scope in which processing details do not derive a contradiction. Moreover, other step/steps may be added between the processing steps. Furthermore, a step described as one step for the sake of convenience may be divided and executed into a plurality of steps, and steps described as two or more for the sake of convenience may be executed as one step.

Second Embodiment

Next, the second embodiment of the present invention will be explained. The second embodiment has a configuration of finely controlling the transition between sleep states by using parameters on more times than those of the first embodiment. Hereinafter, points different from the first embodiment will be centrally explained.

1. Brief

Figure 6:
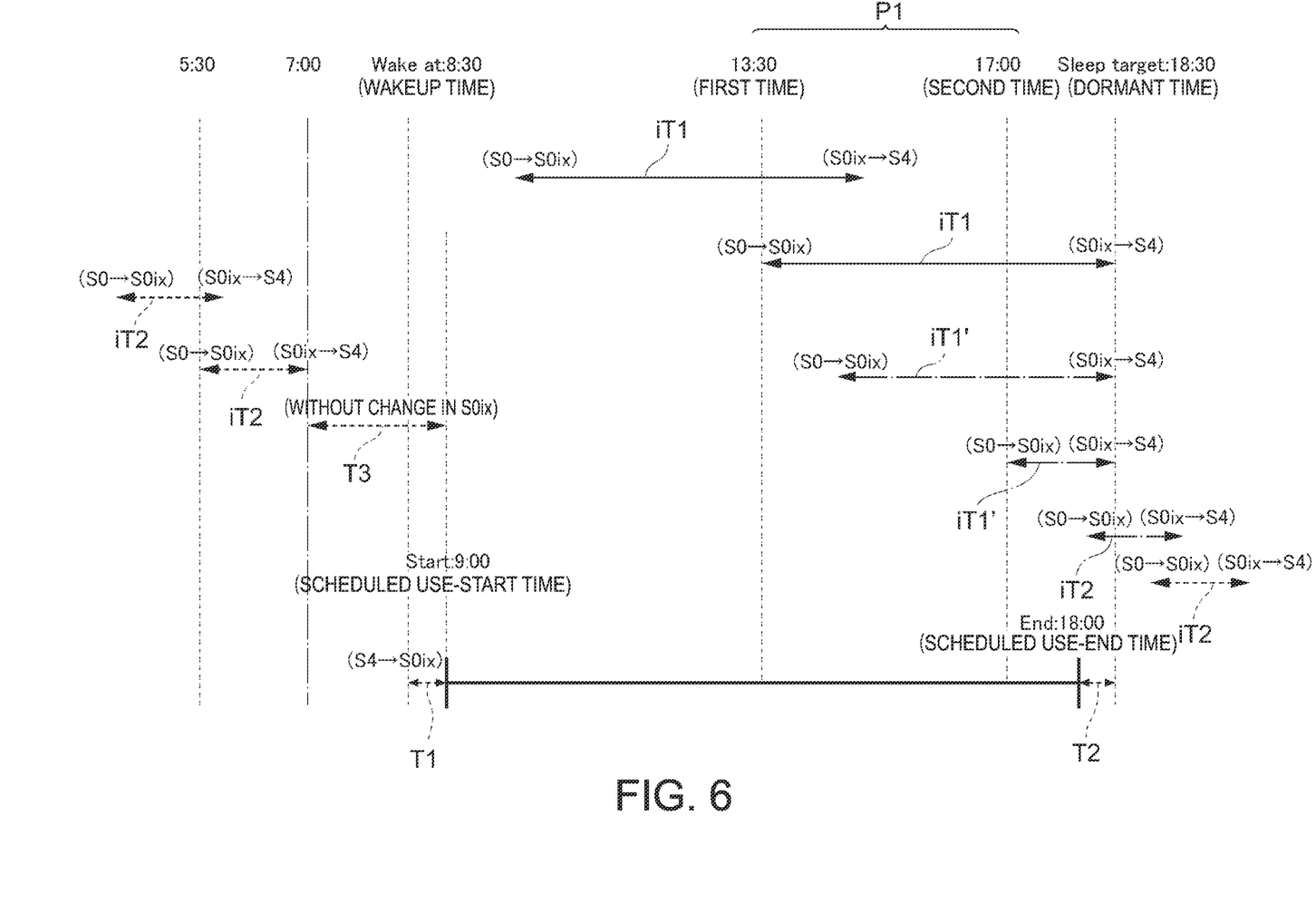
FIG. 6 is a schematic diagram explaining a computer according to a second embodiment.

The brief of the transition between sleep states of a computer 500 according to the second embodiment will be explained with reference to FIG. 6. In regard to points different from the first embodiment, the explanations of the brief are performed by using three configurations: (1) a configuration that the computer 500 is made stepwise transition to an active state (S0 state) via a shallow sleep state (S0ix state) by providing a margin before a scheduled use start; (2) a configuration that the computer 500 is made transition to a deep sleep state (S4 state) with a constant temporal margin by providing a margin after a scheduled use end; and (3) a configuration that the transition to a redundant deep sleep state for which the reduction of power consumption cannot be substantially achieved before the use start is restrained.

(1) When the computer is in the S4 state of the second sleep state within an interval between the scheduled use-start time (9:00) of a user and a timing (hereinafter, called "wakeup time" at 08:30) obtained by taking a predetermined margin (hereinafter, called "first predetermined time T1" for 30 minutes in this example) before the scheduled use-start time, the computer 500 transitions from the S4 state to the S0ix state of the first sleep state. According to this configuration, because the computer 500 can be in the S0ix state when starting to use the computer 500, the computer can shorten a return time.

(2) The computer 500 changes the first idle time iT1 to the first idle time iT1' and sets the first idle time iT1' to transition from the S0ix state to the S4 state at a timing (hereinafter, called "dormant time" at 18:30) obtained by taking a predetermined margin (hereinafter, called "second predetermined time T2" for 30 minutes in this example) after the scheduled use-end time (18:00) of the user. More specifically, in this setting, when the computer 500 becomes an idle state at 15:00, the scheduled end time (20:00) of the first idle time iT1 is after a time (18:30) after the second predetermined time T2 passes from the scheduled use-end time (18:00). In this case, the computer 500 changes the first idle time iT1 (300 minutes) to the first idle time iT1' (210 minutes) and sets the first idle time iT1' so as to transition from the S0ix state to the S4 state at the dormant time. According to this configuration, even when becoming the idle state near the scheduled use-end time, the computer 500 can transition to the S4 state in accordance with the dormant time obtained by taking the predetermined margin from the scheduled use-end time.

(3) The computer 500 does not transition to the deep S4 state even after the second idle time iT2 passes within a predetermined time (hereinafter, called "third predetermined time T3" for 120 minutes in this example) before the scheduled use-start time of the computer 500. Specifically, the computer 500 does not transition from the S0ix state to the S4 state even if the second idle time iT2 passes within an interval (from 07:00 to 09:00) between the scheduled use-start time and a time obtained by advancing the scheduled use-start time by the third predetermined time T3.

Even if the computer 500 is temporarily caused to transition to the S4 state within the third predetermined time T3, the computer transitions to the S0ix state or the S0 state because the computer arrives the wakeup time or the scheduled use-start time immediately after that. For this reason, for example, in regard to power consumption required for writing and reading to and from HDD in the state transition of the S4 state, the computer 500 may return to the S0ix state or the S0 state without recovering this power consumption. In this case, it becomes difficult for the computer 500 to achieve the reduction of power consumption that is a main purpose for transitioning to the S4 state deeper than the S0ix state etc. Therefore, the computer 500 can restrain a redundant state transition for which the reduction of power consumption cannot be substantially achieved by providing the third predetermined time T3 in which such the transition to the deep sleep state is suspended.

2-2. Functional Configuration of Information Processing Apparatus

Figure 7:
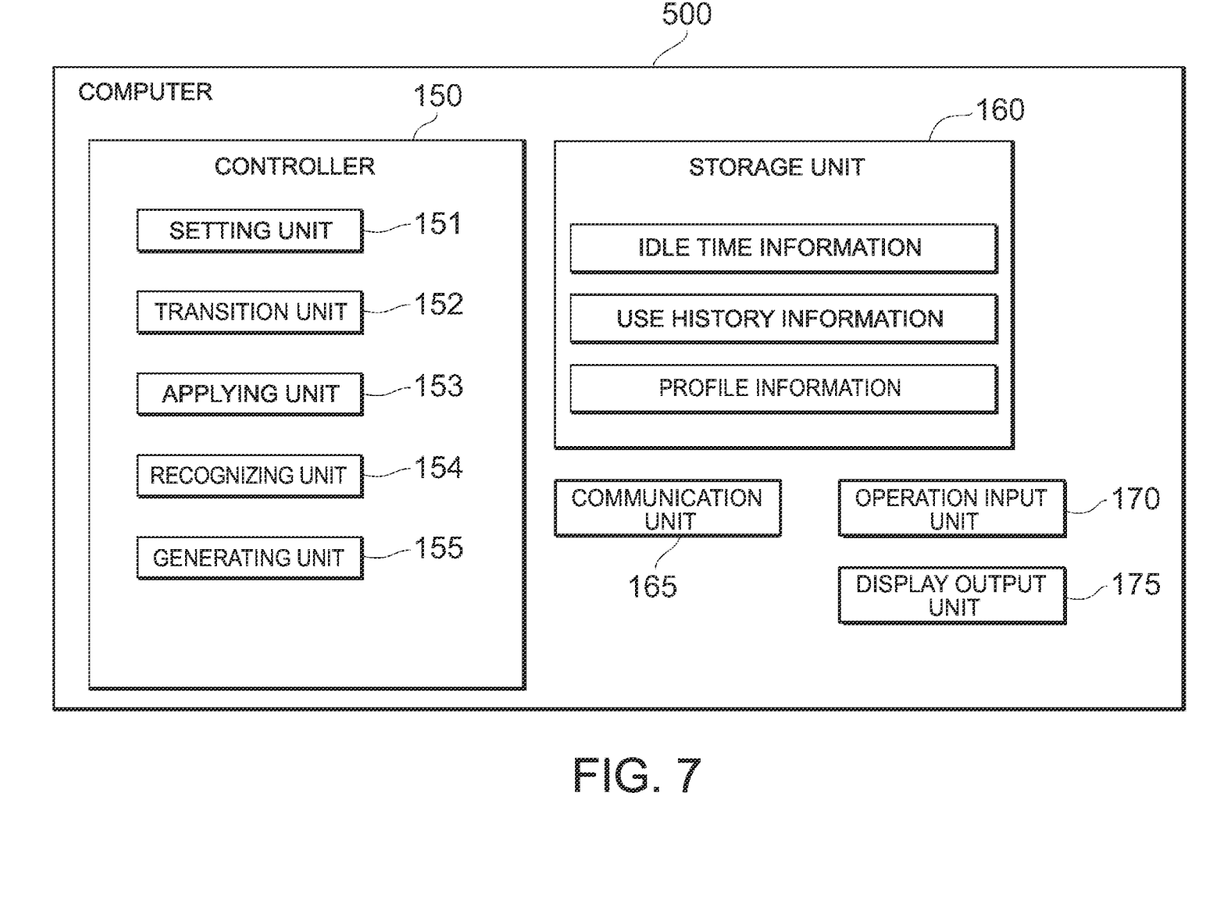
FIG. 7 is a diagram illustrating an example of the functional configuration of the computer according to the second embodiment.

An example of the functional configuration of the computer 500 according to the second embodiment will be explained with reference to FIG. 7. The computer 500 includes a generating unit 155 in addition to the functional components of the computer 100 according to the first embodiment. Moreover, the computer 500 stores profile information including values of the first idle time iT1, the second idle time iT2, etc., in addition to the information stored in the storage unit 160 of the computer 100. The profile information will be explained in conjunction with the setting unit 151 to be described later.

When being in the second sleep state at a time obtained by going back by the first predetermined time T1 from the scheduled use-start time, the computer 500 transitions to the first sleep state.

When the scheduled end time of the first idle time iT1 arrives after the second predetermined time T2 passes from the scheduled use-end time, the computer 500 transitions to the second sleep state after the second predetermined time T2 passes from the scheduled use-end time.

When a time from the scheduled end time of the second idle time iT2 to the scheduled use-start time is shorter than the third predetermined time, the computer 500 does not transition from the first sleep state to the second sleep state even if the second idle time iT2 passes.

The setting unit 151 sets the first predetermined time T1, the second predetermined time T2, and the third predetermined time T3. The first predetermined time T1 is a margin for stepwise returning the computer 500 from the second sleep state to the first sleep state shallower than the second sleep state before the scheduled use start of the computer 500. Moreover, the second predetermined time T2 is a margin for making the computer 500 transition to the second sleep state deeper than the first sleep state with a constant temporal margin after the scheduled use end of the computer 500. Furthermore, the third predetermined time T3 is a time for restraining the transition to a redundant deep sleep state for which the reduction of power consumption cannot be substantially achieved before the scheduled use-start time of the computer 500.

For example, a setting method of the first predetermined time T1 etc. performed by the setting unit 151 includes: (1) a setting method by a setting input from the user on a parameter screen; (2) a setting method of using fixed parameters such as registry parameters of the computer 500; and (3) a setting method by one piece of profile information selected by the user of the computer 500 from among a plurality of pieces of profile information generated by the generating unit 155 to be described later.

Figure 8:
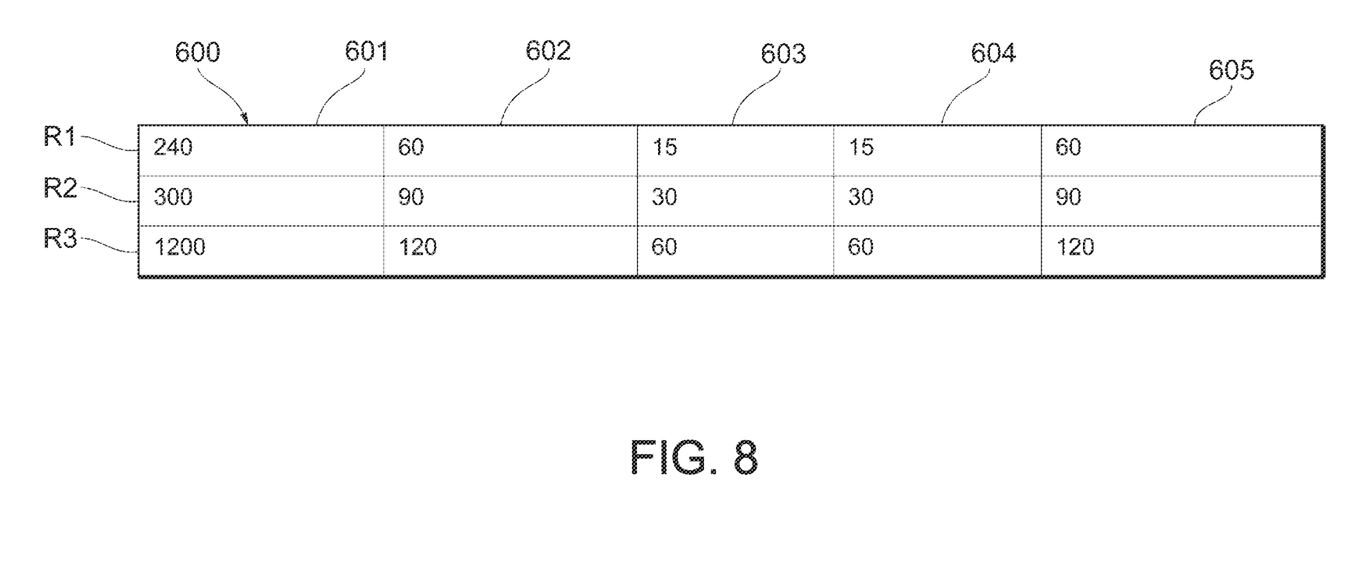
FIG. 8 is a diagram explaining an example of data structure of the computer according to the second embodiment.

Herein, the profile information will be explained with reference to FIG. 8. The "profile information" is information obtained by setting, by device, by user, or by purpose, and combining values of the first idle time iT1, the second idle time iT2, the first predetermined time T1, the second predetermined time T2, and the third predetermined time T3 (hereinafter, collectively called "time parameter"). FIG. 8 is a table illustrating an example of data structure of profile information 600. As illustrated in FIG. 8, the profile information 600 includes information on a first idle time 601, a second idle time 602, a first predetermined time 603, a second predetermined time 604, and a third predetermined time 605. Needless to say, all the pieces of information are not necessarily included in the profile information, and also information other than these pieces may be included in the profile information. Namely, it is required that the profile information is appropriately set in accordance with a state transition process etc. using the profile information. In addition, the unit of the value of each item illustrated in FIG. 8 is "minute".

Furthermore, FIG. 8 illustrates, as an example of the profile information according to purpose, records R1 to R3 according to purpose that use a state transition function, such as (1) a record (R1) of emphasizing the reduction of power consumption, (2) a record (R2) of balancing the reduction of power consumption with the reduction of return time, and (3) a record (R3) of emphasizing the reduction of return time.

The record R1 is an example in which the value of the item of each time parameter is set along the purpose (1) of "emphasizing the reduction of power consumption". For example, the first idle time 601 and the second idle time 602 in the record R1 have shorter values than the other profile information of the record R2, the record R3, and the like. Because the value of each item of the record R1 is set as described above, idle times to be applied are short to that extent and thus the record R1 causes the computer 500 to more easily transition to the second sleep state than the other profile information. Therefore, it is easy to achieve the reduction of power consumption.

Moreover, values of the first predetermined time 603, the second predetermined time 604, and the third predetermined time 605 in the record R1 are also set to be shorter than values of the record R2 and the record R3. More specifically, the value of the first predetermined time 603 is set to be shorter than those of the other profile information in order to cause the computer 500 to stay in the second sleep state longer than the cases of the other profile information. Moreover, the value of the second predetermined time 604 is set to be shorter than those of the other profile information in order to cause the computer 500 to transition to the second sleep state earlier than the cases of the other profile information. Moreover, the value of the third predetermined time 605 is set to be shorter than those of the other profile information in order to cause the computer 500 to easily transition to the second sleep state by shortening a time in which the computer does not transit to the second sleep state.

The record R2 is an example in which the value of the item of each time parameter is set along the purpose (2) of "balancing the reduction of power consumption with the reduction of return time". Each item of the record R2 is set to have a value between the values of the records R1 and R3. For example, each item of the record R2 has the value of 1.5 times to 2 times of the corresponding value of the record R1 and the value of 0.5 times to 0.75 times of the corresponding value of the record R3.

The record R3 is an example in which the value of the item of each time parameter is set along the purpose (3) of "emphasizing the reduction of return time". Contrary to the record R1, the values of the first idle time 601 and the second idle time 602 in the record R3 are set to be longer than the other profile information of the record R1 and the record R2. Because the value of each item of the record R3 is set as described above, idle times to be applied are long to that extent and thus the record R3 causes the computer 500 not to more easily transit to the second sleep state than the other profile information (causes the computer to remain in the first sleep state). Therefore, it is easy to achieve the reduction of return time. In particular, in the record R3, the value of the first idle time 601 can be set to "1200 minutes" to be longer than the use time zone (from 9:00 to 18:00) as illustrated in FIG. 1. If the longer value than the use time zone is set as the first idle time 601 as described above, the computer 500 can be prevented from transiting to the second sleep state in this use time zone.

The values of the first predetermined time 603, the second predetermined time 604, and the third predetermined time 605 in the record R3 are also set to be longer than the values of the record R1 and the record R2. More specifically, the value of the first predetermined time 603 in the record R3 is set longer than the other profile information in order to cause the computer 500 to transition to the first sleep state earlier than the other profile information. The value of the second predetermined time 604 in the record R3 is set longer than the other profile information in order to cause the computer to transition to the second sleep state later than the other profile information. The value of the third predetermined time 605 in the record R3 is set longer than the other profile information in order to cause the computer not to easily transition to the second sleep state by lengthening a time in which the computer does not transition to the second sleep state.

The plurality of pieces of profile information according to purpose may include: a first piece of profile information in which the respective values of the time parameters included in the profile information are set shorter than those of the other pieces of profile information; a second piece of profile information in which the respective values of the time parameters are set longer than those of the other pieces of profile information; and a third piece of profile information in which the respective values of the time parameters are set to values between the values set in the first piece of profile information and the values set in the second piece of profile information. According to such a configuration, because the plurality of pieces of profile information according to purpose can be previously prepared and thus a user only selects profile information tailored to one's own purpose from among the prepared plurality of profiles, it is possible to provide a computer having high convenience.

Returning to FIG. 7, the explanation is continued. In setting the third predetermined time T3, the setting unit 151 may estimate the value of the third predetermined time T3 in terms of whether power consumption necessary to make the computer 500 transition from the first sleep state to the second sleep state can be recovered depending on to what extent the computer 500 stays in the second sleep state. In other words, the setting unit 151 estimates the value of the third predetermined time T3 as the branching point of the determination as to whether, before the scheduled use start of the computer 500, power consumption can be reduced by a method of making the computer 500 transit from the first sleep state to the second sleep state or a method of restraining the transition from the first sleep state to the second sleep state to remain in the first sleep state.

For example, (1) the setting unit 151 computes power consumption (hereinafter, also called "first power consumption") in a period in which, within the third predetermined time T3, the computer 500 transitions from the first sleep state to the second sleep state and then again transits to the first sleep state or returns to the active state. Moreover, (2) the setting unit 151 computes a power consumption difference (hereinafter, also called "second power consumption") by the computer 500 between the first sleep state and the second sleep state within the third predetermined time T3. The setting unit 151 may estimate the value of the third predetermined time T3 by employing the threshold of the third predetermined time T3 at the time when the first power consumption computed in the above point (1) becomes smaller than the second power consumption computed in the above point (2).

In the above method, the first power consumption is constant regardless of the value of the third predetermined time T3, but the second power consumption increases in proportion to the value of the third predetermined time T3. Therefore, the first power consumption is large at the beginning of the third predetermined time T3, but a turnaround is made at the time of the threshold and then the second power consumption becomes large. For this reason, by employing the threshold as the value of the third predetermined time T3 through the method, a time in which the computer should be in the second sleep state to the minimum can be set as the third predetermined time T3.

For example, as the computation method of power consumption, the computation method (1) of the first power consumption described above may estimate the first power consumption once when the transition is performed from the first sleep state to the second sleep state and then the transition to the first sleep state is again performed, by computing an average value of historic data based on the historic data of past power consumption. Moreover, the method (2) may estimate the second power consumption by calculating average values of power consumption per unit time of the first and second sleep states based on the historic data of past power consumption and multiplying the third predetermined time T3 by a difference between the calculated average values per unit time. Based on the values estimated as described above, the setting unit 151 sets the threshold of the third predetermined time T3 at which the first power consumption becomes smaller than the second power consumption.

The setting unit 151 can set a wakeup time obtained by advancing the scheduled use-start time by the first predetermined time T1. Moreover, as the scheduled use-end time, the setting unit 151 can set a dormant time obtained by delaying the scheduled use-end time by the second predetermined time T2.

The setting unit 151 can set a day on which the user is scheduled to use the computer 500 through the method (1) or the method (2) explained as the setting method of the first predetermined time T1 etc.

The transition unit 152 can make the computer 500 transit to the first sleep state when the computer 500 is in the second sleep state between the wakeup time and the scheduled use-start time.

The transition unit 152 may not make the computer 500 transition from the first sleep state to the second sleep state even when the second idle time iT2 passes between the scheduled use-start time and a time obtained by advancing the scheduled use-start time by the third predetermined time.

On a day other than the day scheduled to use the computer 500 set by the setting unit 151, the transition unit 152 may remain in the second sleep state even within the first predetermined time T1. According to this configuration, the reduction of power consumption can be achieved by remaining in the second sleep state deeper than the first sleep state on a day, such as a holiday, in which the user does not use the computer 500 throughout the day.

When the scheduled end time of the first idle time iT1 is after the dormant time, the applying unit 153 changes the first idle time iT1 to the first idle time iT1' and applies the first idle time iT1' to the computer so that the computer 500 transitions from the first sleep state to the second sleep state after a predetermined idle time passes from the dormant time.

The generating unit 155 generates the plurality of pieces of profile information that includes at least one of the time parameters. For example, the generating unit 155 may set the value of each time parameter through the setting input on the parameter screen. The generating unit 155 generates profile information for each of the values of the set and input time parameters or for each of the combinations of the values of the time parameters.

The generating unit 155 can set and combine the values of the time parameters for each of the purposes (1) to (3) of using the state transition function to generate the profile information according to purpose.

In setting the values of time parameters in the purpose (1), the generating unit 155 may: calculate, based on a historic data group of time parameter and a historic data group of power consumption, for example, a regression curve approximately (so that a distance between a curved line and a data plot group of the time parameters becomes the minimum) by using statistical processing performed by a regression analysis in which time parameter is an explanatory variable (feature amount) and power consumption is an objective variable (feature amount); and estimate the value of each time parameter, by which the power consumption can be reduced, by using the regression curve.

Similarly to the purpose (1), in setting the value of each time parameter in the purpose (3), the generating unit 155 may: calculate, based on the historic data group of parameter and the historic data group of return time, for example, a regression curve approximately by using statistical processing performed by the regression analysis in which time parameter is an explanatory variable and power consumption is an objective variable; and estimate the value of each time parameter, by which the return time can be shortened, by using the regression curve.

Furthermore, in setting the value of each time parameter in the purpose (2), the generating unit 155 may perform a statistical analysis on the values of the time parameters estimated in the purposes (1) and (3) for each time parameter to calculate a medium value or an average value of the values, and estimate the value of each time parameter for balancing the reduction of power consumption with the reduction of return time by using the calculated medium value etc.

For example, the operation input unit 170 may receive setting input of each time parameter on the parameter screen. Moreover, the operation input unit 170 may receive the selection input of the user as to which profile is applied from among the plurality of profiles generated by the generating unit 155 on the parameter screen, for example. In other words, the operation input unit 170 enables the user to select and input a piece of profile information from among the plurality of pieces of profile information.

3. Example of Screen

Figure 9:
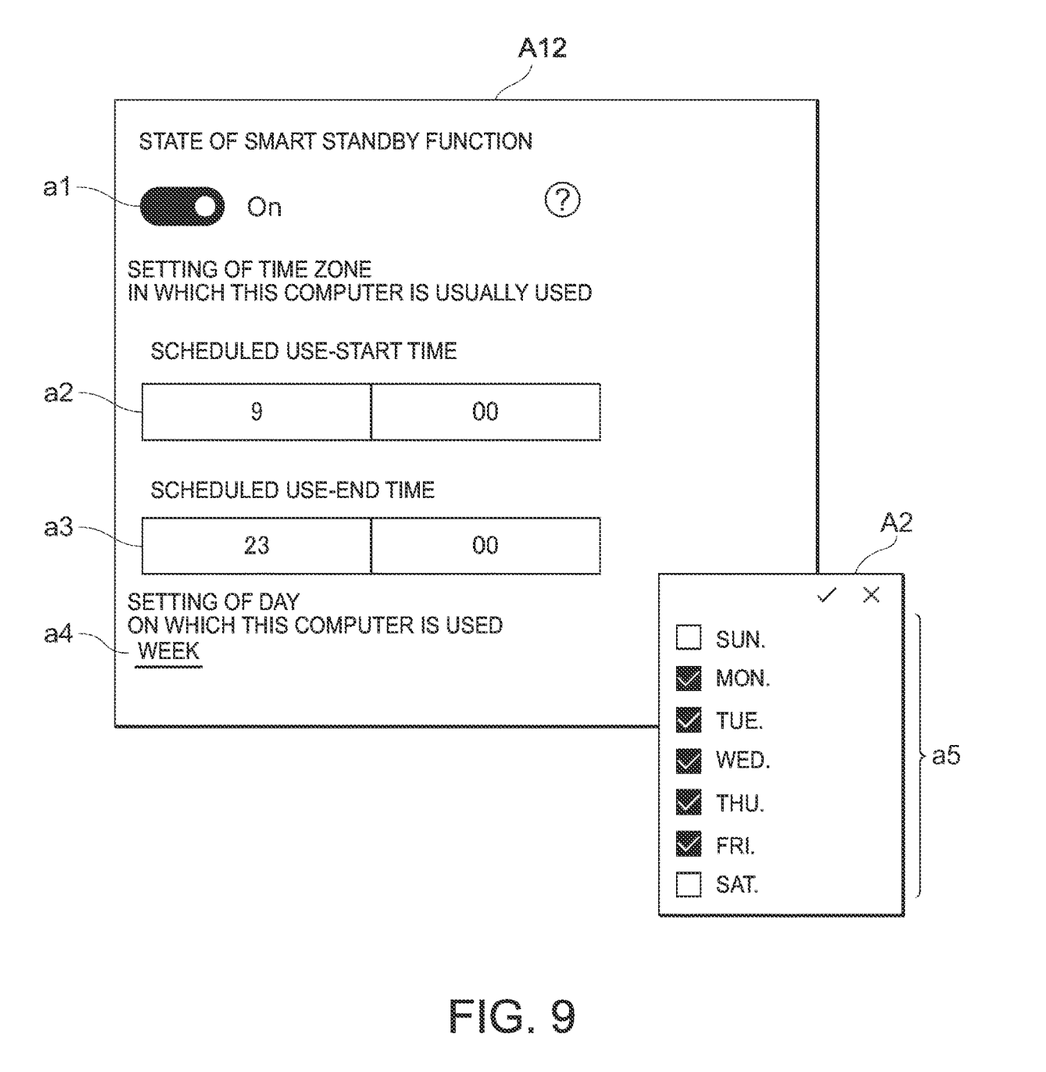
FIG. 9 is a diagram illustrating an example of a screen of the computer according to the second embodiment.

An example of the screen of the computer 500 according to the second embodiment will be explained with reference to FIG. 9. FIG. 9 is a diagram illustrating an example of a parameter screen A12 and a sub-screen A2. As illustrated in FIG. 9, the parameter screen A12 according to the second embodiment includes a usable-day setting link a4 in addition to the components included in the parameter screen A1 according to the first embodiment. Moreover, in addition to the parameter screen A12, the computer 500 displays the sub-screen A2 displayed from the parameter screen A12.

The usable-day setting link a4 receives the display designation of the sub-screen A2. When the usable-day setting link a4 receives the display designation, the computer displays the sub-screen A2 in a pop-up manner.

The sub-screen A2 includes a usable-day-setting check box a5. The usable-day-setting check box a5 receives the setting input of a day on which the computer 500 is used. In addition, the sub-screen A2 may change text display of the usable-day setting link a4 in accordance with the set matter. More specifically, the text display may be changed in such a manner that "weekdays" is displayed if Monday to Friday on weekdays are set and input and "every day" is displayed if all days are set and input.

Furthermore, the parameter screen A12 may include an item (not illustrated) such as a form for setting and inputting each time parameter. Moreover, the parameter screen A12 may include an item (not illustrated) such as a pull-down menu for selecting and inputting a profile to be applied to the computer 500.

Alternative Example

The present invention has been explained based on the embodiments, but the present invention is not limited to the embodiments. The following cases are included in the present invention.

(1) The state transition function according to the embodiments may be invalidated when the computer is supplied with an AC power source and may be validated when the computer is driven by a battery. In case of the AC power source, it is considered that the case where the transition to the second sleep state after the second idle time iT2 passes is not performed is preferable because it is not much required to save power consumption and a maintenance process such as the updating of OS is prompted in the non-use time zone. In such a case, the computer may validate the state transition function only when it is driven by a battery.

It is not illustrated in the embodiments, but when the computer 500 does not become an active state within a second predetermined period, the transition unit 152 may not transition from the second sleep state to the first sleep state when becoming the first predetermined time T1 before the next scheduled start time after the second predetermined period has passed. Herein, the "second predetermined period" is a threshold for determining that the computer 500 is not used for a long term and is not scheduled to be used in the future. More specifically, it is preferable that the second predetermined period is a period such as one week and half a month. According to this configuration, the computer 500 that is not used for a few days can be restrained from needlessly transiting to the shallow first sleep state.

OTHER EMBODIMENT

The above embodiments are intended to facilitate the comprehension of the present invention, and are not interpreted to limit the scope of the present invention. The present invention may be modified and improved (e.g., to combine the embodiments and to omit a part of the configuration of each embodiment) and may include their equivalents, without departing from its spirit.

The invention claimed is:

1. An information processing apparatus comprising a processor, the processor being configured to:
    enter a first sleep state when transition is performed from an active state to an idle state;
    transition to a second sleep state having a longer return time to the active state than a return time to the active state of the first sleep state, if there is no operation by a user for a first idle time when entering the first sleep state that is before a previously set scheduled use-end time that is after a previously set scheduled use-start time; and
    transition to the second sleep state if there is no operation by the user for a second idle time that is shorter than the first idle time when entering the first sleep state that is before the scheduled use-start time;
    wherein the processor is further configured to, when a time from a scheduled end time of the second idle time to the scheduled use-start time is shorter than a predetermined time interval, not transition from the first sleep state to the second sleep state even if the second idle time passes between the scheduled use-start time and a scheduled start time of the predetermined time interval, and further passes into another predetermined time interval;
    wherein the first idle time is after the scheduled use-start time;
    wherein the second idle time is before the scheduled use-start time;
    wherein the predetermined time interval is before the scheduled use-start time;
    wherein the another predetermined time interval is after the predetermined time interval and immediately before the scheduled use-start time;
    wherein the predetermined time enables the apparatus to restrain transition to the second sleep state during which power consumption of the apparatus cannot be substantially achieved before the scheduled use-start time.

2. The information processing apparatus according to claim 1, wherein the processor is further configured to transition to the first sleep state from the second sleep state at a time obtained by going back by the another predetermined time from the scheduled use-start time.

3. The information processing apparatus according to claim 1, wherein the processor is further configured to, when a scheduled end time of the first idle time arrives after a further predetermined time following the scheduled use-end time, transition to the second sleep state.

4. The information processing apparatus according to claim 1, further comprising an operation input unit configured to enable selection and input by the user of a plurality of pieces of profile information that includes at least one of time parameters of the first idle time, the second idle time, the first predetermined time interval and the another predetermined time interval.

5. The information processing apparatus according to claim 4, wherein the plurality of pieces of profile information includes:
    a first piece of profile information in which respective values of the time parameters are set shorter than those of some pieces of the profile information;
    a second piece of profile information in which respective values of the time parameters are set longer than those of other pieces of the profile information; and
    a third piece of profile information in which respective values of the time parameters are set to values between the values set in the first piece of profile information and the values set in the second piece of profile information.

6. The information processing apparatus according to claim 1, wherein the processor is further configured to, between a time obtained by going back by the first idle time from the scheduled use-end time and a time obtained by going back by the second idle time from the scheduled use-end time, changeably set the first idle time so that the first idle time gradually decreases as it approaches the time obtained by going back by the second idle time.

7. The information processing apparatus according to claim 1, further comprising a storage unit configured to accumulate, for a predetermined period, use history information indicating histories of a time at which the information processing apparatus returns to the active state at the earliest within a day and a time at which the information processing apparatus enters the idle state at the latest within the day, wherein:
    the processor is further configured to set at least one of the scheduled use-start time and the scheduled use-end time tailored to use status of the information processing apparatus based on the use history information.

8. An information processing method comprising:
    causing a computer to enter a first sleep state when transition is performed from an active state to an idle state, and to transition to a second sleep state having a longer return time to the active state than a return time to the active state of the first sleep state, if there is no operation by a user for a first idle time when entering the first sleep state that is before a previously set scheduled use-end time that is after a previously set scheduled use-start time;
    causing the computer to transition to the second sleep state if there is no operation by the user for a second idle time that is shorter than the first idle time when entering the first sleep state that is before the scheduled use-start time that is after the scheduled use-end time;
    enabling selection and input by the user of a plurality of pieces of profile information that includes at least one of time parameters of the first idle time, the second idle time, a predetermined time interval, another predetermined time interval, and a further predetermined time interval;
    wherein the plurality of pieces of profile information includes:
    a first piece of profile information in which respective values of the time parameters are set shorter than those of some pieces of the profile information;
    a second piece of profile information in which respective values of the time parameters are set longer than those of other pieces of the profile information; and a third piece of profile information in which respective values of the time parameters are set to values between the values set in the first piece of profile information and the values set in the second piece of profile information.

\* \* \* \* \*